United States Patent
Ayanam et al.

(10) Patent No.: US 9,342,859 B2
(45) Date of Patent: May 17, 2016

(54) GPU BASED PARALLEL IMAGE PROCESSING AT THIN CLIENT

(71) Applicant: AMERICAN MEGATRENDS, INC., Norcross, GA (US)

(72) Inventors: Varadachari Sudan Ayanam, Suwanee, GA (US); Samvinesh Christopher, Suwanee, GA (US); Yugender P. Subramanian, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 301 days.

(21) Appl. No.: 14/060,165

(22) Filed: Oct. 22, 2013

(65) Prior Publication Data

US 2015/0109310 A1 Apr. 23, 2015

(51) Int. Cl.
*G06T 1/20* (2006.01)
*G06T 1/60* (2006.01)
*G06F 3/14* (2006.01)

(52) U.S. Cl.
CPC ............... *G06T 1/20* (2013.01); *G06F 3/1454* (2013.01); *G06T 1/60* (2013.01); *G09G 2340/02* (2013.01); *G09G 2360/06* (2013.01); *G09G 2360/125* (2013.01)

(58) Field of Classification Search
None
See application file for complete search history.

(56) References Cited

U.S. PATENT DOCUMENTS

2012/0075346 A1* 3/2012 Malladi .................. H04N 19/46
345/660

OTHER PUBLICATIONS

Myslewski ("iPhone chip designer trumpets multi-core GPUs", 2009, http://www.theregisterco.uk/2009/03/18/sgx543mp).*
Schaa, Dana, and David Kaeli. "Exploring the multiple-GPU design space."Parallel & Distributed Processing, 2009. IPDPS 2009. IEEE International Symposium on. IEEE, 2009.*
Tyson ("How BIOS Works", 2012, http://computer.howstuffworks.com/bios2.htm/printable).*
Cheung, Ngai-Man, et al. "Video coding on multicore graphics processors."Signal Processing Magazine, IEEE 27.2 (2010): 79-89.*

* cited by examiner

*Primary Examiner* — Kee M Tung
*Assistant Examiner* — Xin Sheng
(74) *Attorney, Agent, or Firm* — Locke Lord LLP; Tim Tingkang Xia, Esq.

(57) ABSTRACT

Disclosed herein is a computing device that includes: a processor; a graphic processing unit having N graphic processing cores, N being an integer greater than 1; a random access memory (RAM); a video port; a non-volatile memory, and a display processing unit. The non-volatile memory stores a virtual desktop client (VDC). The VDC can communicate with a first virtual machine (VM) of a hypervisor running on a remote computing device and receive an encoded image frame from the first VM; instruct the plurality of graphic processing cores to decode the encoded image frame in parallel; and generate a decoded image frame of the encoded image frame. The display processing unit can generate display signals representing the decoded image frame and transmit the display signals to the video port.

30 Claims, 6 Drawing Sheets

GPU BASED PARALLEL IMAGE PROCESSING AT THIN CLIENT

FIELD

The present disclosure generally relates to thin clients or zero clients communicating with virtual machines running on a hypervisor, and more particularly to techniques of graphic processing unit (GPU) based parallel image processing at a thin client.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Traditional network-based computer architectures generally involve multiple traditional personal computers, each of which comprises its own computing system components such as a central processing unit, memory, etc., each of which is connected to a centralized server or servers. Management of resources in such architectures, however, has become increasingly complex as the size of networks continues to grow. In addition to the physical logistics of such a network, problems such as asset management, support costs, troubleshooting, etc., all make such an architecture potentially unworkable. Further, in many cases, network users do not need the resources or computing power offered by a personal computer, and therefore these expensive resources are underutilized in such architectures.

To combat the inefficiencies of traditional network-based computer architectures making extensive use of personal computers, many network-based architectures have transitioned to a server-based computing models, such as thin client or zero client. Typically, a zero client or thin client is heavily dependent on another computer system or server, which generally fulfills the computational rolls for the zero client or ultrathin client. In such cases, the zero client is simply a low-end computer terminal, which includes peripherals such as a monitor, keyboard, and mouse, that also provides a graphical user interface (GUI) to the user. In such configurations, a central computer system or server hosts the operating systems and software applications utilized by the thin client or zero client.

Generally, a system user utilizes the thin or zero client's local GUI to provide credentials that allow the user to access a desktop operating system that is hosted within a virtual machine running on the centralized server. Once the user provides the credentials to access the virtualized desktop, those resources are displayed on the user's monitor, and the resources for providing the local GUI are terminated. In circumstances, a thin client or zero client may have a processor that is less powerful and thus requires a longer time to process and decode image frames.

Therefore, an unaddressed need exists in the art to address the aforementioned deficiencies and inadequacies.

SUMMARY

Certain aspects of the present disclosure are directed to a computing device. The computing device includes: a processor; a graphic processing unit having N graphic processing cores, N being an integer greater than 1; a random access memory (RAM); a video port; a non-volatile memory, and a display processing unit. The non-volatile memory stores a virtual desktop client (VDC). The VDC is configured to, when executed at the processor, communicate with a first virtual machine (VM) of a hypervisor running on a remote computing device and receive an encoded image frame from the first VM; instruct the plurality of graphic processing cores to decode the encoded image frame in parallel; and generate a decoded image frame of the encoded image frame. The display processing unit is configured to generate display signals representing the decoded image frame and transmit the display signals to the video port.

In certain embodiments, the encoded image frame include a plurality of encoded image tiles. The VDC is configured to instruct each of the graphic processing cores to decode a respective one of the plurality of encoded image tiles.

In certain embodiments, the computing device further includes a network communication interface. The RAM is configured to have a general memory area that is utilized by the processor, a graphic memory area that is utilized by the graphic processing unit, and a display memory area that is utilized by the display processing unit. The VDC is configured to receive the encoded image frame through the network communication interface; store the plurality of encoded image tiles of the encoded image frame to the general memory area; copy a first group of N encoded image tiles of the plurality of encoded image tiles to the graphic memory area; and instruct the N graphic processing cores to concurrently decode the first group of encoded image tiles.

In certain embodiments, the graphic memory area includes N graphic memory sections. The VDC is configured to copy each of the N encoded image tiles of the first group to a respective one of the N graphic memory sections. The N graphic processing cores each are configured to, upon receiving instructions from the VDC, read and decode a respective encoded image tile of the first group stored in a respective one of the N graphic memory sections; and replace the respective encoded image tile stored in the respective graphic memory section with the respective decoded image tile.

In certain embodiments, the VDC is configured to copy the decoded image tiles from the N graphic memory sections to the general memory area. In certain embodiments, the VDC is configured to copy each of a second group of N encoded image tiles to a respective one of the N graphic memory sections. The N graphic processing cores each are configured to, upon receiving instructions from the VDC; read and decode a respective encoded image tile of the second group stored in a respective one of the N graphic memory sections; replace the respective encoded image tile stored in the respective graphic memory section with the respective decoded image tile. The VDC is configured to copy the decoded image tiles from the N graphic memory sections to the general memory area.

In certain embodiments, the N graphic processing cores each are configured to, upon finishing decoding the encoded image tile stored in a corresponding one of the N graphic memory sections, store the decoded image tile to the display memory area. In certain embodiments, the display processing unit is configured to, subsequent to that the N graphic processing cores has stored all of the decoded image tiles to the display memory area, read the decoded image frame from the display memory area.

In certain embodiments, the VDC is configured to copy the plurality of encoded image tiles to the graphic memory area and instruct the N graphic processing cores to process the encoded image tiles by groups of N image tiles; copy each group of N decoded image tiles to the general memory area;

and copy the decoded image tiles of the entire decoded image frame to the display memory area. The display processing unit is configured to read the decoded image frame from the display memory area.

In certain embodiments, the RAM is configured to have a general memory area that is utilized by the processor as well as a graphic memory area that is utilized by both the graphic processing unit and the display processing unit. The VDC is configured to receive the encoded image frame through the network communication interface; store the plurality of encoded image tiles of the encoded image frame to the general memory area; copy a first group of N encoded image tiles of the plurality of encoded image tiles to the graphic memory area; and instruct the N graphic processing cores to concurrently decode the first group of encoded image tiles.

In certain embodiments, the graphic memory area includes N graphic memory sections. The VDC is configured to copy each of the N encoded image tiles of the first group to a respective one of the N graphic memory sections. The N graphic processing cores each are configured to, upon receiving instructions from the VDC, read and decode a respective encoded image tile of the first group stored in a respective one of the N graphic memory sections; and replace the respective encoded image tile stored in the respective graphic memory section with the respective decoded image tile. In certain embodiments, the display processing unit is configured to read the decoded image tiles from the graphic memory area and generate display signals corresponding to the decoded image tiles. In certain embodiments, the VDC is configured to instruct each of the graphic processing cores through a graphic driver.

In certain embodiments, the non-volatile memory stores a user interface (UI) configured to, when executed at the processor, receive input from a user of the computing device. The UI is configured to communicate with the first VM hosted by a hypervisor of a remote computer system, and wherein the UI is configured to initialize the virtual desktop client (VDC) locally; and send signals associated with input from a user to the first VM hosted by the hypervisor.

In certain embodiments, the computing device is a thin client or zero client. The input received from a user of the computing device includes at least one of: user name; password; and selection of a virtual machine. The non-volatile memory further stores a boot program, wherein the processor is configured to load the boot program into the RAM, wherein the boot program is configured to, when executed by the processor, initialize the RAM and the graphic processing unit.

Certain aspects of the present disclosure are directed to a method implemented by a computing device. The computing device includes a processor; a graphic processing unit having N graphic processing cores, N being an integer greater than 1; a random access memory (RAM); a video port; a non-volatile memory, and a display processing unit. The method includes: at a virtual desktop client (VDC) executed at the processor, communicating with a first virtual machine (VM) of a hypervisor running on a remote computing device and receive an encoded image frame from the first VM; instructing the plurality of graphic processing cores to decode the encoded image frame in parallel; and generating a decoded image frame of the encoded image frame; and generating, at the display processing unit, display signals representing the decoded image frame and transmit the display signals to the video port.

Certain aspects of the present disclosure are directed to a non-transitory computer-readable medium storing computer executable instructions for controlling a computing device to perform operations. The computing device includes a processor; a graphic processing unit having N graphic processing cores, N being an integer greater than 1; a random access memory (RAM); a video port; a non-volatile memory, and a display processing unit. The operations include: at a virtual desktop client (VDC) executed at the processor, communicating with a first virtual machine (VM) of a hypervisor running on a remote computing device and receive an encoded image frame from the first VM; instructing the plurality of graphic processing cores to decode the encoded image frame in parallel; and generating a decoded image frame of the encoded image frame; and generating, at the display processing unit, display signals representing the decoded image frame and transmit the display signals to the video port.

These and other aspects of the present disclosure will become apparent from the following description of the preferred embodiments taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

Figure 1:
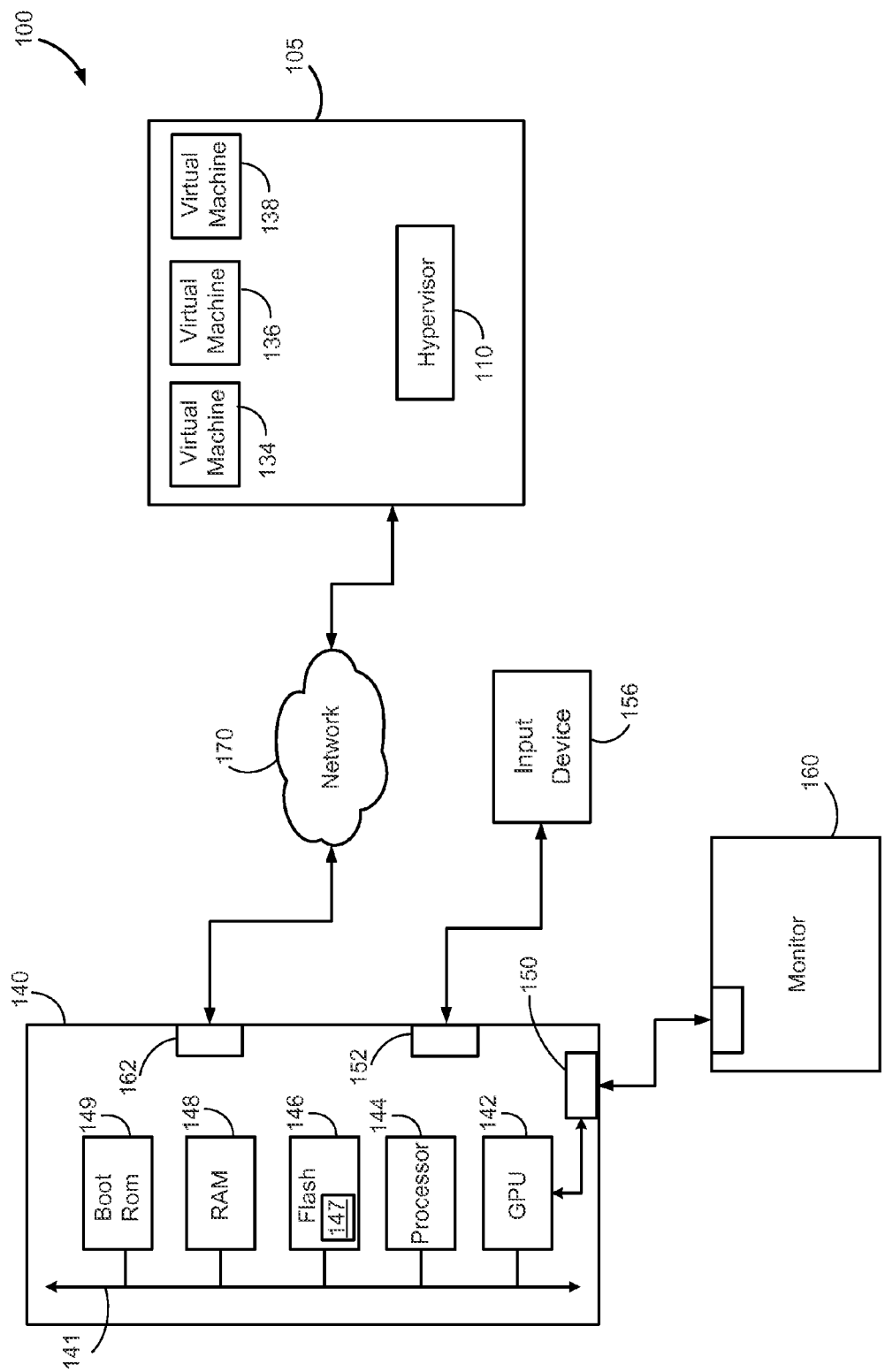
FIG. 1 illustrates an environment in which an embodiment of a thin client or zero client is operatively connected to a computer system hosting multiple virtual machines or unprivileged domains, according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate; meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

FIG. 1 shows an environment 100 in which an embodiment of a thin client or zero client 140 is operatively connected to a computer system 105 hosting multiple virtual machines or unprivileged domains (e.g., 134, 136, and 138), which are managed by a hypervisor 110, according to certain embodiments of the present disclosure. As shown in the FIG. 1 embodiment, the client 140 is configured to operatively connect to the computer system 105 via a network 170 such as the Internet. In alternate embodiments, the client 140 and computer system 105 may be interconnected via a local area network (LAN) or wide area network (WAN). The connection between the client 140 and the computer system 105 may be configured to display and audio to the client 140 as well as keyboard or mouse input/output to the computer system 105 by means of a single protocol (e.g., the TCP/IP protocol).

As shown, FIG. 1 schematically illustrates a thin client or zero client 140 in accordance with certain embodiments of the present disclosure. As previously noted, a thin client or zero client 140 generally is a computer that relies heavily on some other computer system or server (e.g., 105) to fulfill its computational roles. In certain embodiments, a thin client or zero client 140 comprises a local operating system, though this local operating system typically provides basic functionalities such as a local graphical interface. For example, in one embodiment, the local operating system may be a kernel such as the LINUX™ kernel. In certain embodiments, the thin client or zero client comprises a processor (or a system on a chip) 144, graphic processing unit 142, a non-volatile memory (such as a flash memory) 146, and a random access memory (RAM) 148, which are in communication with each other through a system bus 141. Further, as shown in the FIG. 1 embodiment, the thin client 140 comprises a boot rom 149. The client 140 may comprise additional physical or virtual components not shown in the FIG. 1 embodiment. Further, though the FIG. 1 environment 100 shows only a single thin client 140, it is common for multiple thin clients or zero clients to exist as components of a broader computer infrastructure wherein each of the clients share resources from the same server or computer system 105.

In one embodiment, a thin client 140 is a computer terminal or other housing connected to a monitor or computer display 160 that provides a graphical user interface (alternatively, GUI, local GUI, UI) to a user, as will be discussed further. In the FIG. 1 embodiment, the client 140 does not include a conventional operating system as it receives such resources from the computer system 105 (as will be discussed). The client 140 may, however, comprise an operating system in various other embodiments.

The processor 144 can be any suitable processor that may contain digital, analog, mixed-signal, and radio-frequency functions. Generally, the processor 144 comprises various hardware components (e.g., processor core, timing sources, external interfaces, analog interfaces, voltage regulators, etc.) as well as related software. Further, in certain embodiments, the processor 144 can be configured to read and execute code from a preset location of the flash memory 146. For example, a loader program, which can load additional code, can be placed at a preset location.

In certain embodiments, the boot rom 149 contains the initial code that the processor 144 executes after a power-on reset. For example, the initial code can include necessary code and configurations to initialize the flash memory 146. Subsequently, the initial code can instruct the processor 144 to load a boot program from a predetermined location in the flash memory 146. In certain embodiments, the boot rom 149 can be a small piece of mask ROM or write-protected flash embedded inside the processor 144, an EPROM chip, etc.

As shown in the FIG. 1 embodiment, the client 140 comprises various memory elements such as a flash memory device 146 and a random-access memory (RAM) device 148, which are configured in accordance with certain embodiments of the present disclosure. In one embodiment, the memory devices (e.g., 146 and 148) are not user-modifiable and are simply involved in the operation of the client 140. In other embodiments, the memory devices (e.g., 146 and 148) may be user-modifiable and may be used to store data and information relating to the operation of the client 140.

Generally, the flash memory 146 stores information in an array of memory cells made from floating-gate transistors. Such a configuration is different in nature from other volatile or non-volatile memory because the information or data stored therein must be erased before new data can be written into the memory cells. In general, there are two common types of flash memory: NAND-type (named after NAND logic gates) and NOR-type (named after NOR logic gates). In a NAND-type flash memory, data may be written and read in "blocks" or "pages," which are the basic accessible memory units. The NOR-type flash memory allows a single machine word (i.e., byte) to be written or read independently. In either flash memory type, however, the erasing process is limited to erasing one block at a time. In other words, the flash memory 146 does not offer random-access erasing or rewriting operations. In other embodiments the flash memory 146 may be provided as a serial peripheral interface (SPI) flash memory.

In one embodiment, the flash memory 146 stores a boot program 147 that includes code and configurations that, when executed by the processor 144, can test and initialize some or all of the components of the thin client or zero client 140. Further, the boot program 147 may include code and configurations that, when executed by the processor 144 can initialize a local graphical user interface 315 and a monitoring application 310, as will be described below.

In one embodiment, the RAM device 148 has a boot memory space that is utilized by a boot program, a general area, and a graphic area, as will be discussed in connection with FIG. 3.

As further shown in the FIG. 1 embodiment, the client 140 comprises a graphic processing unit 142 (i.e., video adapter, graphics card, display card, etc.). In general, the graphic processing unit 142 converts binary data into images displayed on the monitor 160. In one embodiment, the graphic processing unit 142 comprises a processor (i.e., graphics processing unit or GPU) and a small amount of embedded memory but also utilizes the RAM 148 of the client 140. According to one embodiment, in such a configuration (i.e., shared graphics memory), a mechanism exists (e.g., via the BIOS or a jumper setting) to select the amount of system memory that will be dedicated to displaying graphics. As will be discussed further in connection with FIGS. 3-4, in certain embodiments, the graphic processing unit 142 can access the graphic area in the RAM device 148.

In one embodiment, the client also comprises a connection system between the graphic processing unit 142 and the monitor or computer display 160. In one embodiment, the connection system is a video graphics array (VGA, VGA connector), which is an analog-based standard interface. Alternatively, in one embodiment, the connection system is a digital visual interface (DVI), with is the digital-based standard design for most flat-panel displays. In other embodiments, the connection system may be a high-definition multimedia interface (HDMI) or other connection means familiar to one of ordinary skill in the art. As will be discussed, in one embodiment, the graphic processing unit is configured to transmit both a local GUI and/or the user interface of a virtual machine or operating system to the monitor 160, as will be discussed.

Additionally, as shown in the FIG. 1 embodiment, the client 140 comprises an interface 152, which is a physical input/output hardware device such as a USB port. In one embodiment, the interface 152 allows a user to connect various peripherals to the client 140 such as human interface devices (or input devices) 156 including a keyboard or mouse (or any other human interface devices), with which the user can interact with the local GUI and/or the user interface of a virtual machine. Alternatively, in other embodiments any other serial bus protocol aside from USB may be used as desired.

In certain embodiments, the thin client 140 has a network communication interface 162. Through the network communication interface 162, the thin client 140 is in communication with the hypervisor 110 and the virtual machine 134, 136, 138 through the network 170. For example, as will be described in detail below, the virtual machine 134, 136, 138 can send image frame signals to the thin client 140 through the network communication interface 162. The thin client 140 can send input control commands or data to the virtual machine 134, 136, 138 or the hypervisor 110 through the network communication interface 162.

Figure 2:
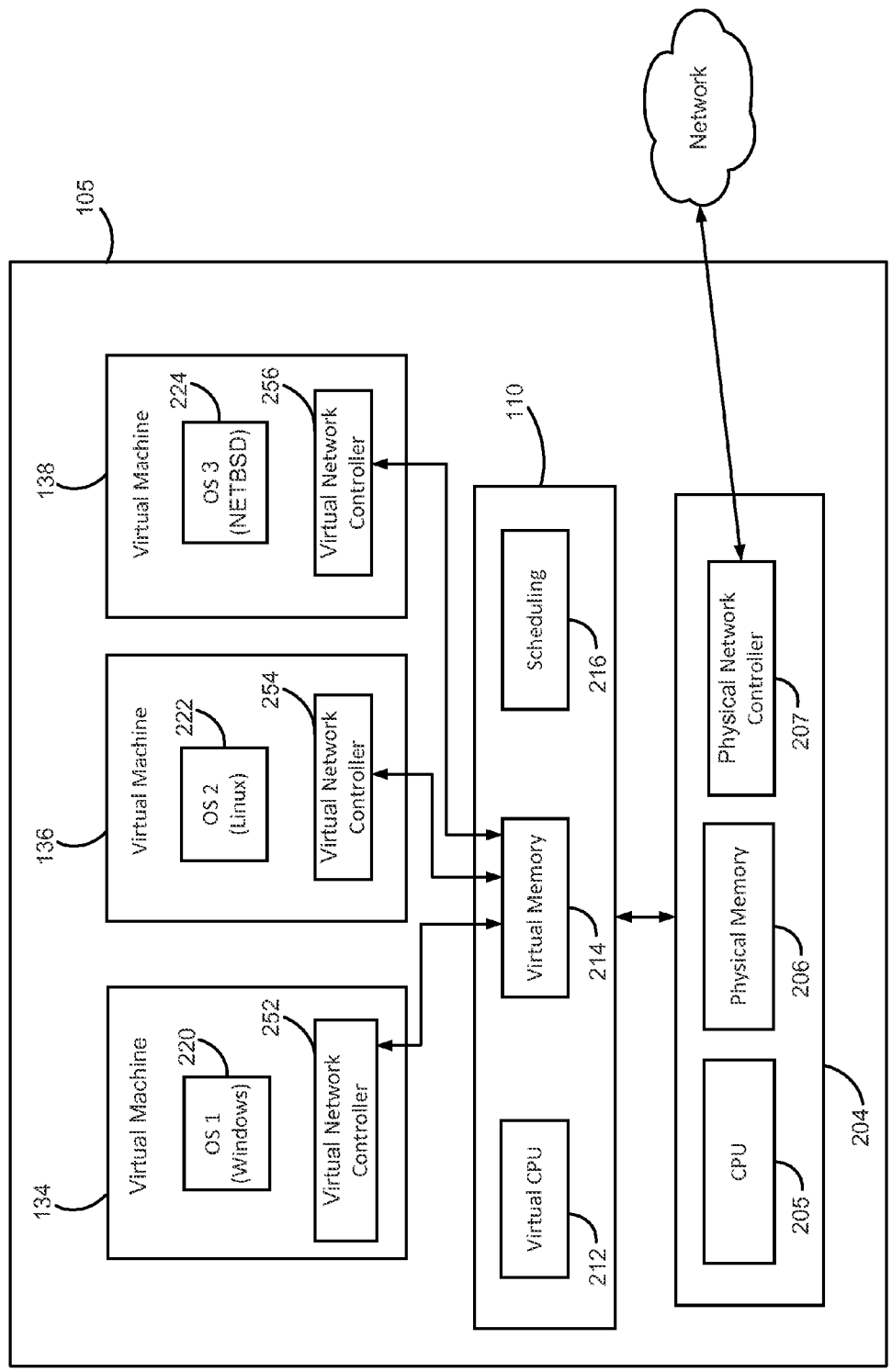
FIG. 2 schematically illustrates a computer system in which a hypervisor hosts multiple virtual machines or unprivileged domains in accordance with certain embodiments of the present disclosure.

FIG. 2 illustrates a more detailed view of computer system 105 in which a hypervisor 110 hosts multiple virtual machines (i.e., unprivileged domains) 134, 136, 138 in accordance with certain embodiments of the present disclosure. Virtualization allows a number of virtual servers (such as an operating system 220, 222, 224) to be consolidated into a single physical machine 204, without losing the security gained by having completely isolated environments. Virtualization makes it relatively easy to migrate virtual machines from one physical computer to another, thus making it easy to maintain redundant virtual server images synchronized across physical machines. A virtual machine gets certain features, such as cloning, at a very low cost. A virtual machine can be migrated to another host if the hardware begins to experience faults or if an upgrade is scheduled. The virtual machine can then be migrated back to the original machine when the original machine is working again. Further, a virtual machine can be accessed by a thin client or zero client 140 that is able to utilize the resources offered by the virtual machine without allocating the client's 140 local resources to hosting an operating system locally.

In certain embodiments, a hypervisor 110 is running on the computer system 105. Stated in a simplified way, the hypervisor 110 runs on top of the hardware including the CPU 205 and the physical memory 207. In certain embodiments, the hypervisor 110 can be stored or pre-built in a flash ROM of the computer system 105. Alternatively, the hypervisor can be stored or pre-built in the hard drive of the computer system 105. The hypervisor has, among other thing, virtual CPUs 212, virtual memories 214, and scheduling services 216. Further, in one embodiment, the hypervisor 110 hosts virtual machines or domains 134, 136, 138, which encapsulate a complete running virtual environment. According to one embodiment, a thin client or zero client 140 can access one of the virtual machines (e.g., 134, 136, 138) and interface with the graphical interface of the virtual machine at the monitor 160 connected to the client 140. According to certain embodiments, the connectivity between the virtual machine (e.g., 134) and the monitor 160 of the client 140 is provided via a virtual desktop client (VDC) using a standard or proprietary protocol such as a Remote Desktop Protocol (RDP) client, a Virtual Network Computing (VNC) client, or an AAVICA client as provided by AMERICAN MEGATRENDS INC. Further, in one embodiment, each VDC or an RDP client is in communication with one of the operating systems running on the virtual machines hosted by the hypervisor 110, and the VDC or RDP client transmits user input signals to the operating system through one or more virtual desktop protocols supported by the operating system, while operating system in turn transmits or redirects video display signals or video display data to the VDC or RDP client. In alternate embodiments, the VDC or RDP client may be in communication with the hypervisor 110 or a server-side client that is in communication with the hypervisor 110.

One skilled in the art would appreciate that the hypervisor 110 can also run on two CPUs, four CPUs, eight CPUs, or any suitable number of CPUs. The hypervisor 110 can be of various types and designs, such as CITRIX™, XEN™, MICROSOFT HYPER-V™, VMWARE ESX™. The hypervisor 110 can emulate one or more virtual machines or domains 134, 136, 138. An operating system 220, 222, 224 can be installed in a virtual machine 134, 136, 138. The operating system 220, 222, 224 may not realize that it is running on virtual machine and may perceive that it is running on a physical machine. The operating systems 220, 222, 224 running on the virtual machine 134, 136, 138 can host one or more application programs.

In certain embodiments, the hypervisor 110 hosts one or more virtual machines (unprivileged domains) 134, 136, 138. According to one embodiment, each of the virtual machines 134, 136, 138 can run an operating system or other guest. For example, the first virtual machine 134, the second virtual machine 136, and the third virtual machine 138 can run WINDOWS™, LINUX™, and NETBSD™ operating systems (or various other operating systems), respectively, any of which may be accessed by a thin client or zero client 140. In one embodiment, the operating system (e.g., 220) can be collective management software for managing the operation of various resources or processes that may be utilized by the client 140. For example, the operating system (e.g., 220) can include a set of functional programs that control and manage operations of devices that may be connected to the client 140. Generally, the set of application programs provide certain utility software for the user to manage the client 140 or various other computing processes. In certain embodiments, the operating system is operable to multitask, i.e., execute computing tasks in multiple threads.

Further, in one embodiment, a virtual machine 134, 136, 138 can provide a virtual network controller 252, 254, 256. From the perspective of an operating system or other guest run in the virtual machine 134, 136, 138, the virtual network controller 252, 254, 256 appears as a physical network controller. The operating system 220, 222, 224 can utilize the virtual network controller 252, 254, 256 to access the network. For example, the operating system 220 in the virtual machine 134 can have a network interface for communicating with the virtual network controller 252. To support the operating system 220 run in the virtual machine 134 in accessing an Ethernet network and/or IP network, the virtual network controller 252 can be assigned a MAC address 264 and/or IP address 266, which can be utilized in interfacing with the thin client or zero client 140.

Figure 3:
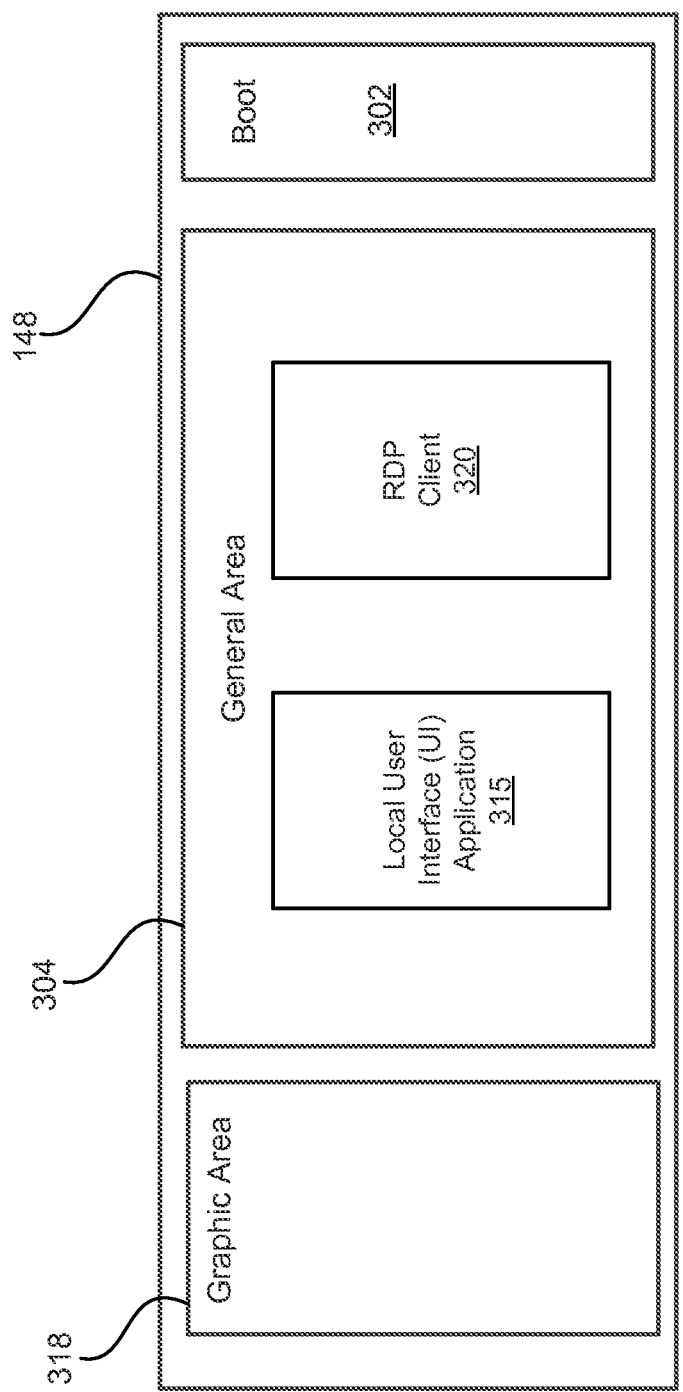
FIG. 3 schematically illustrates a RAM device configured in accordance with certain embodiments of the present disclosure.

FIG. 3 illustrates memory allocation of the RAM device 148 in accordance with certain embodiments of the present disclosure. In certain embodiments, the thin client 140 has a UI 315 stored in the flash memory 146. When the thin client 140 is initially boot up, the processor 144 can load the UI 315 into the RAM device 148. The RAM device 148 can be any suitable type, such as DDR3. Typically, the RAM device 148 has a boot memory area 302 that is utilized by a boot program as well as other memory (i.e., general area 304) that is accessible to and utilized by various other devices on the thin client 140 (e.g., processor 144, graphic processing unit 144, etc.).

The processor 144 loads the UI 315 into the general area 304 of the RAM 148. In one embodiment, the UI 315 allows a user to interact with the client 140 and provide various user credentials (e.g., user name, password, etc.), which may be used to select and boot up a VM (e.g., 134) for use on the client 140. In one embodiment, the UI 315 receives user input via a peripheral device such as a keyboard or mouse. In certain embodiments, a boot program 147 initializes the UI 315 in a process and loads the UI 315 to the memory area 304 for execution. The processor executes the UI application 315 and generates image frame data, which are subsequently placed in the graphic area 318 of the RAM device 148. The graphic area 318 is also accessible by the graphic processing unit 142, which subsequently processes the image frame data and generates video output signals accordingly. The video output signals are transmitted from a video output of the thin client 140 to a video input of the monitor 160.

As previously noted, a user may utilize the UI 315 of the thin client 140 to provide credentials of a particular virtual machine 134 (e.g., user name, password, etc.), which allow the user to select that particular virtual machine 134 to access via the thin client 140 during a particular session, i.e., the duration in which the user is engaging the particular virtual machine 134.

Typically, when a user initiates a session with a particular virtual machine 134, a graphical interface for interfacing with the virtual machine 134 is provided from the computer system 105 to the client 140 via a network connection. For example, the graphical interface for interfacing the virtual machine 134 can be provided to a virtual desktop client (VDC) 320 via various communication protocols such as the Remote Desktop Protocol (RDP). The VDC 320 such as an RDP client is a client application allowing a user to access and control resources at a remote computer (e.g., computer system 105). Alternatively, the graphical interface for interfacing the virtual machine 134 may be provided as part of a virtual desktop infrastructure (VDI) via a commercial product such as XENDESKTOP™ as provided by CITRIX™ or HORIZON VIEW™ as provided by VMWARE™ according to one embodiment.

For simplicity and brevity, in the below description, the present disclosure may only use RDP and its associated applications as examples. One skilled in the art, however, would appreciate other remote communication protocols such as those mentioned above including VDI, XENDESKTOP™, HORIZON VIEW™ can be similarly adapted in certain embodiments of the present disclosure.

As discussed above, the hypervisor 110 runs one or more virtual machines 134, 136, 138, which each in turn can run an operating system. Each operating system can run one or more remote desktop server (not shown) such as an RDP server or a VDI server.

After a user selects a particular virtual machine (which is defined to include the operating system run in the virtual machine) through the UI 315, the UI 315 can launch a RDP client 320 that can communicate with the remote desktop server (not shown) of the selected virtual machine 134, 136, 138. As shown in the FIG. 3 embodiment, the processor 144 loads the RDP client software 320 into RAM device 148. In one embodiment, when the processor 144 executes the RDP client software 320 to communicate with the remote desktop server (not shown), the remote desktop server responds by providing display data of the virtual machine 134. In one embodiment, the remote desktop server receives the display data from the OS 220 run on the virtual machine 134 and send the display data to the RDP client 320. According to one embodiment, the RDP client 320 routes the display data to the graphic area 318 of the RAM device 148 where it can be accessed and processed by the graphic processing unit 142 such that it can be displayed on the monitor 160.

In certain embodiments, the thin client 140 can receive image frame data from the remote desktop servers (not shown) of the virtual machines 134, 136, 138. Although the remote desktop server (not shown) utilized by each virtual machine may be different and in accordance with different specification or protocol, typically the remote desktop server (not shown) processes the raw image frame data generated by the virtual graphic unit of the virtual machine 134, 136, 138, and then can encode and compress (from now on collectively "encode") the raw image frame data to generate encoded image frame data. The remote desktop server (not shown) then sends the encoded image frame data to the thin client 140 through the network 170.

At the thin client 140, the VDC 320, when executed at the processor 144, the processor 144 receives the encoded image frame data through the network communication interface 162. The VDC 320 can decompress and decode (from now on collectively "decode") the encoded image frame data. The decoded image frame data is placed in the display memory area 460 of the RAM 148. Subsequently the graphic processing unit 142 can access the display memory area 460 and generate display signals based on the decoded image frame data, and then send the display signals to the monitor 160 through a video port 150.

Figure 4:
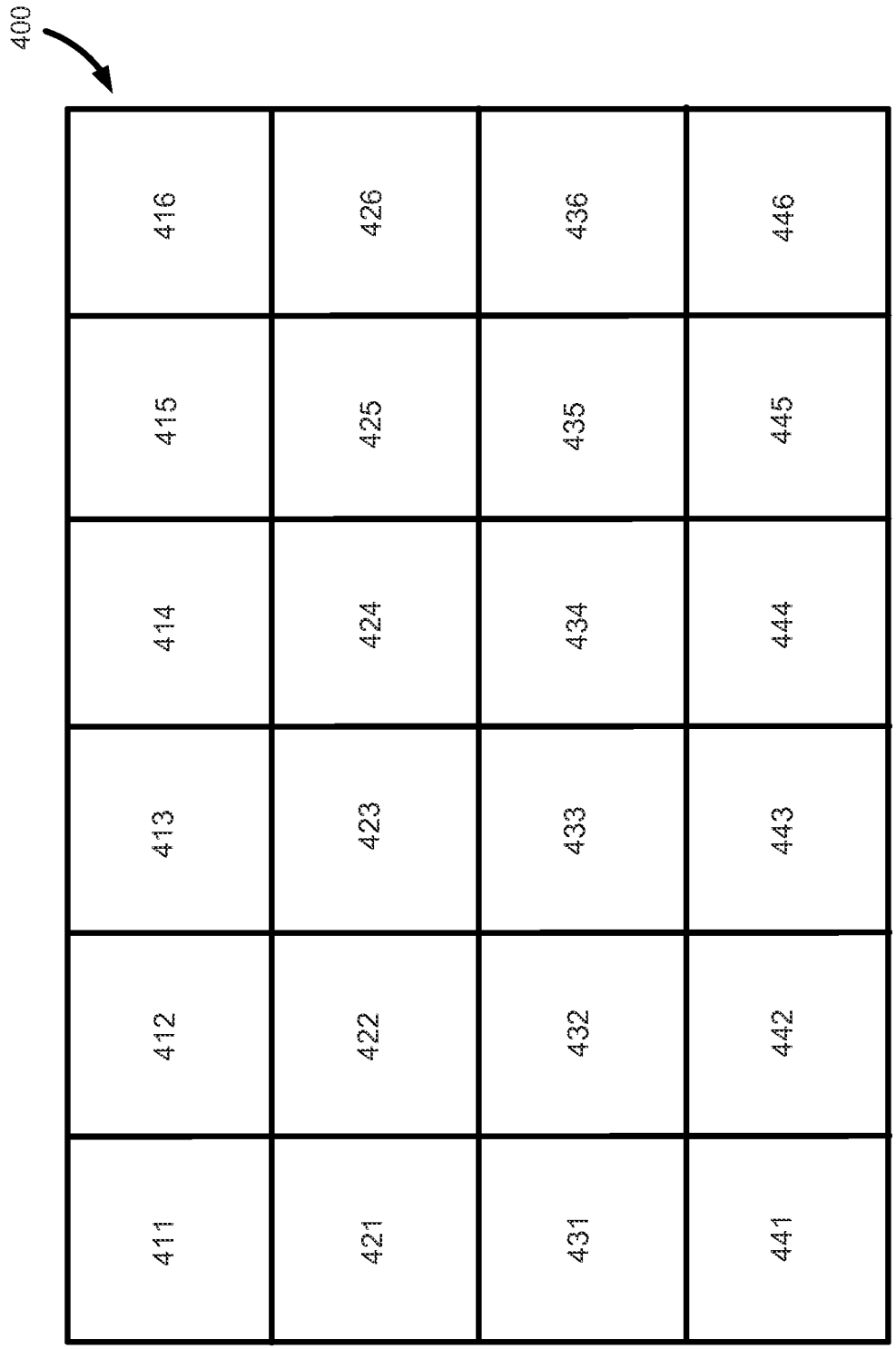
FIG. 4 illustrates an image frame in accordance with certain embodiments of the present disclosure.

In certain embodiments, according to the specific specification or protocol (e.g., RDP), the remote desktop server (not shown) can divide an image frame (for example generated by the virtual graphic unit) into multiple tiles. The remote desktop server (not shown) then encodes each tile and sends the encoded tiles to the thin client 140. FIG. 4 illustratively shows that a single image frame 400 is divided into 4 rows and 6 columns (i.e., 24 tiles). One skilled in the art would appreciate that the image frame can be divided into any suitable number of tiles such as 48 tiles, 64 tiles, 128 tiles.

As an illustrative example, the remote desktop server (not shown) divides an image frame into 24 tiles as shown in FIG. 4, and, after encoding the tiles, transmits the encoded tiles row by row from left to right. In other words, the remote desktop server (not shown) transmits tile 411, tile 412, . . . tile 416, tile 421, . . . tile 426, tile 431, . . . tile 436, tile 441, . . . tile 446.

Figure 5:
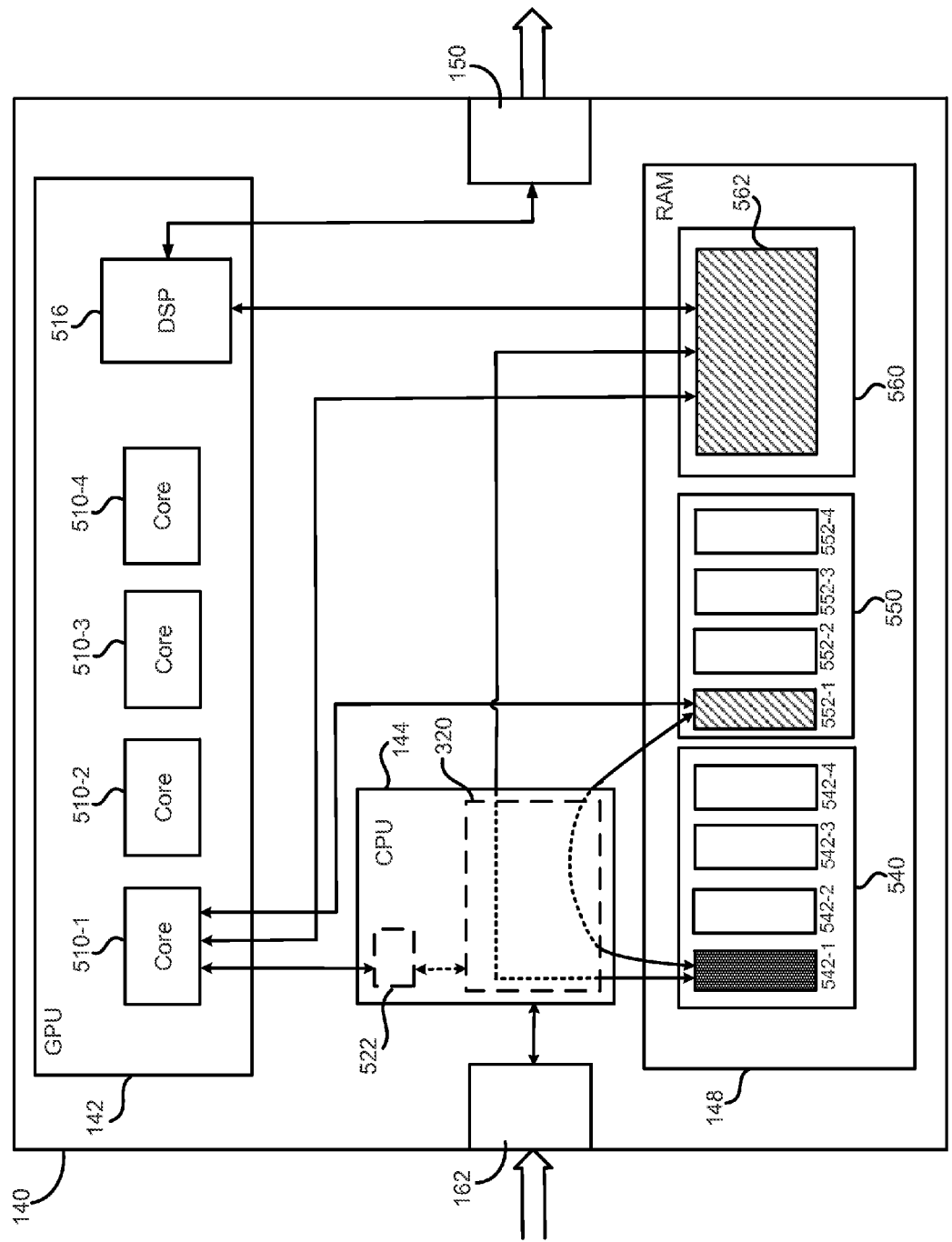
FIG. 5 schematically illustrates a thin client in communication with a hypervisor in accordance with certain embodiments of the present disclosure.

FIG. 5 schematically shows a thin client 140 in accordance with certain embodiments of the present disclosure. In certain embodiments, as shown, the graphic processing unit 142 can include multiple graphic processing cores 510. In the example shown in FIG. 5, the graphic processing unit 142 has four graphic processing cores 510. Further, the graphic processing unit 142 can also have a graphic display unit 516 (or digital signal processor, DSP) that can generate display signals based on image frame data. One skilled in the art would appreciate that the graphic processing unit 142 may have any suitable number of graphic processing cores 510, for example, eight graphic processing cores 510, or 16 graphic processing cores 510. Further, in certain embodiments, the graphic processing cores 510 and the graphic display unit 516 can be separate chips, instead of being built on a single chip.

Each graphic processing core 510 is specifically designed to process graphic data such as decoding encoded graphic data. The graphic processing core 510 can have built-in graphic processing functions such as converting image data from one format to another or decoding that are data encoded in various formats to raw pixel data. Further, the graphic processing core 510 can access predefined or specific memory locations to obtain image data for processing. A program (e.g., the VDC 320) running on the processor 144 can utilize a GPU driver 522 to access and control the graphic processing unit 142 including each of the graphic processing cores 510. By using the driver 522, the program can instruct each of the graphic processing core 510 regarding where (e.g., a memory location) to obtain the image data, how to process (e.g., using a specific image processing function), and where to store the processed image data. For example, the program can call a driver 522 that are in accordance with OpenGL™ specifications (such as version 4.4), which are defined by the OpenGL™ Architecture Review Board (ARB) and are incorporated herein by reference. In certain embodiments, the program can call a driver that is implemented through CUDA, which is a parallel computing platform and programming model defined by NVIDIA™ Corporation.

In certain embodiments, the RAM 148 has a general memory area 540 that typically stores data and/or codes to be executed at the processor 144, a graphic memory area 550 that typically stores data and/or codes to be executed at the graphic processing cores 510, and a display memory area 560 that typically stores data and/or codes to be executed at the graphic display unit 516. Further, in certain embodiments, the general memory area 540 can be configured to include multiple general memory sections 542. The graphic memory area 550 can be configured to include multiple graphic memory sections 552 that each correspond to a graphic processing cores 510 of the graphic processing unit 142. For example, the graphic processing core 510-1 is configured to access the graphic memory section 552-1. Similarly, the other graphic processing cores are configured to access the other graphic memory sections 552-2, 552-3, 552-4, respectively.

In certain embodiments, the VDC 320, when executed at the processor 144, receives the image frame data transmitted from the virtual machine 134, 136, 138 through the network communication interface 162. The VDC 320 implements the same specification or protocol (e.g., RDP) used by the remote desktop server (not shown) to divide and encode the image frame. Therefore, the VDC 320 has information regarding how an image frame is divided and transported to the thin client 140. In other words, the VDC 320 can determine that a collection of data received from the virtual machine 134, 136, 138 represents an image frame and that certain subsections of the data collection represent certain encoded image tiles.

In certain embodiments, the VDC 320 can utilize the multiple graphic processing cores 510 available in the graphic processing unit 142 and implement a parallel processing technique to increase efficiency of graphic processing. For example, once receiving a data collection including multiple encoded tiles representing an image frame, the VDC 320 can store each encoded tile at a general memory section 542 in the general memory area 540. Then, the VDC 320 can copy one encoded tile or a group of encoded tiles to each graphic memory section 552. For example, the VDC 320 can copy the encoded tile stored in the general memory section 542-1 to the graphic memory section 552-1. Similarly, the VDC 320 can copy the encoded tile stored in the general memory section 542-2 to the graphic memory section 552-2, and so on. Subsequently, after some or all of the graphic memory sections 552 are stored with encoded tiles, the VDC 320 can instruct the graphic processing cores 510 through the GPU driver 522 to start processing those encoded tiles simultaneously or concurrently. For example, the VDC 320 can instruct the graphic processing core 510-1 to read data of encoded tile from the graphic memory section 552-1 and to decode the encoded tile data to raw pixel values of that tile. In certain embodiments, the graphic display unit 516 itself can process image data of certain formats. Accordingly, the VDC 320 can instruct the graphic processing core 510-1 to convert the encoded tile stored in the graphic memory section 552-1 to a format that can be processed by the graphic display unit 516. After processing the encoded data, the graphic processing core 510-1 can, e.g. as instructed by the VDC 320, store the decoded data back to the graphic memory section 552-1 and delete the encoded data in the graphic memory section 552. In the example shown in FIG. 5, the VDC 320 can similarly instruct the other graphic processing cores 510-2, 510-3, 510-4 to decode the encoded tiles stored in the corresponding graphic memory sections 552 concurrently with the process of the graphic processing core 510-1, respectively. In other words, by utilizing this parallel processing technique, the VDC 320 can utilize the multiple graphic processing cores 510 available in the graphic processing unit 142 to process/decode multiple encoded tiles simultaneously or concurrently.

In certain embodiments, the VDC 320 instructs the graphic processing unit 142 to parallel processing a group of tiles whose number is responding to the number of available graphic processing cores 510. In the example shown in FIG. 5, the VDC 320 instructs the graphic processing unit 142 to parallel process the group of 4 tiles at a time. After the graphic processing unit 142 decoded a first group of tiles and stored the decoded tile data back to the graphic memory area 550 using the technique described above, the VDC 320 can copy the decoded data of the group of tiles from the graphic memory area 550 to the general memory area 540. Then the VDC 320 copies a second group of encoded tiles from the general memory area 540 to the graphic memory sections 552 and instructs, through the GPU driver 522, the graphic processing unit 142 to parallel process the second group of encoded tiles. After the graphic processing unit 142 decoded the second group of encoded tiles and the stored the decoded tiles back to the graphic memory sections 552, the VDC 320 copies the decoded second group of tiles to the general memory area 540.

The VDC 320 continue processing the encoded tiles group by group until the encoded image frame has been entirely decoded by the graphic processing unit 142 utilizing the parallel decoding technique. By this time, the entire decoded image frame is stored in the general memory area 540. Subsequently, the VDC 320 can copy the decoded image frame from the general memory area 540 to the display memory area 560.

The graphic display unit 516 accesses the display memory area 560 and reads the pixel values of an image frame to be displayed at the monitor 160. The graphic display unit 516 generates video signals based on the pixel values of the image frame and sends the signals to the video port 150.

In certain embodiments, the VDC 320 can instruct each graphic processing core 510, after decoding a specific encoded tile, to directly store the decoded data of that specific tile to a memory location preconfigured for that specific tile based on an identification of the specific tile. Using the image frame shown in FIG. 4 as an example, the VDC 320 can configure the display memory area 560 to have 24 display sections that each correspond to a respective tile of the image frame 400. Therefore, after parallel processing a group of encoded tiles, the graphic processing unit 142 writes the decoded data to the preconfigured memory locations for the group of tiles. After each encoded tile of the image frame 400 is processed by the graphic processing unit 142, the graphic processing unit 142 will have written to the display memory area 560 of the decoded data for the image frame 400.

Subsequently, the graphic display unit 516 accesses the display memory area 560 and reads the pixel values of an image frame to be displayed at the monitor 160. The graphic display unit 516 generates video signals based on the pixel values of the image frame and sends the signals to the video port 150.

Figure 6:
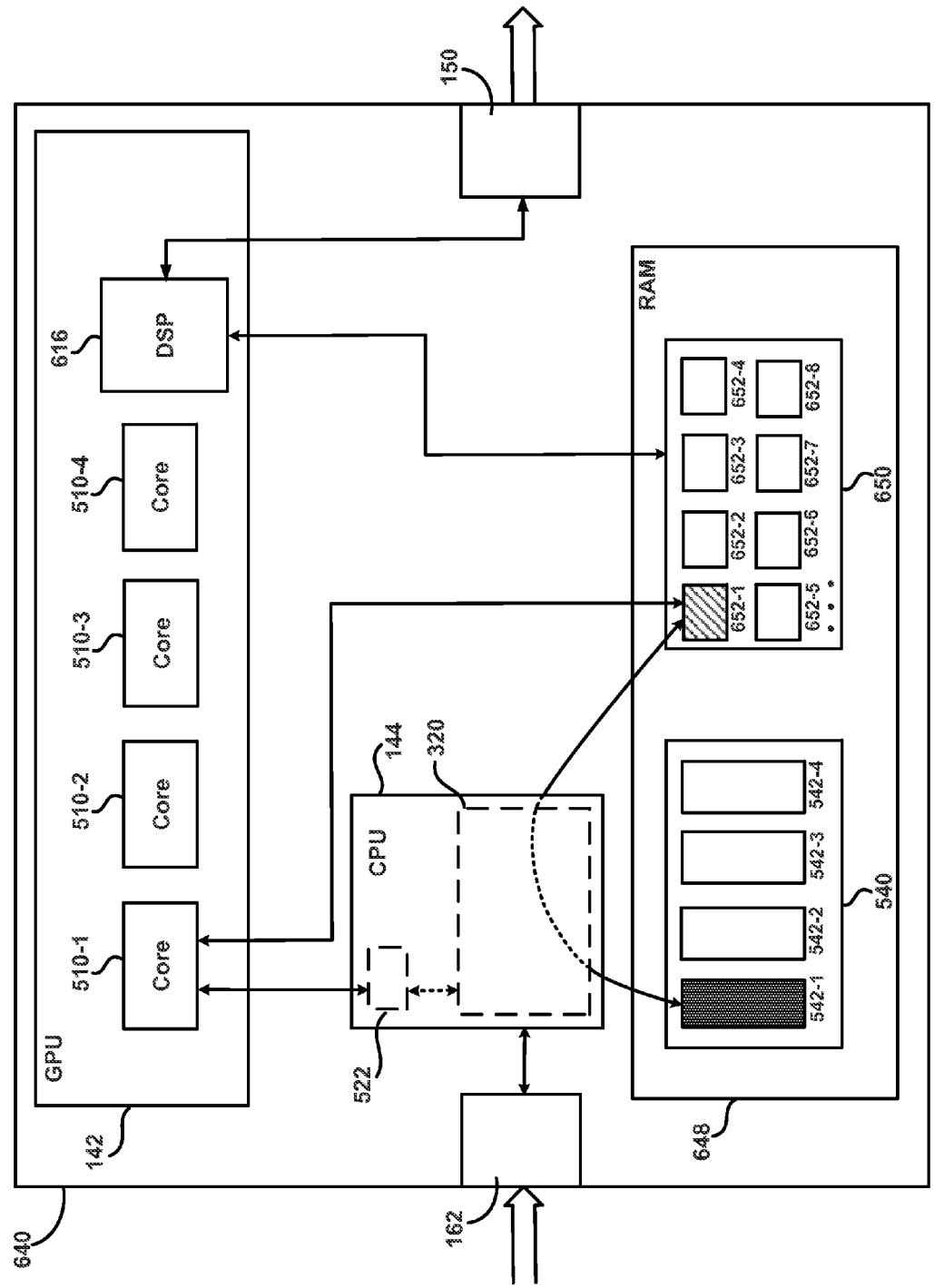
FIG. 6 schematically shows a thin client in accordance with certain embodiments of the present disclosure.

FIG. 6 schematically shows a thin client 640 in accordance with certain embodiments of the present disclosure. The thin client 640 has a similar structure to that of the thin client 140 shown in the example of FIG. 5 with the following differences. A RAM device 648 of the thin client 640 can be configured to include a general memory area 540 and a graphic memory area 650. A graphic display unit 616 can access the graphic memory area 650, which, in this example, can also serve the purpose of the display memory area 560 shown in FIG. 5. The graphic memory area 650 has multiple graphic memory sections 652 that can be used to store some or the entire decoded image frame. In this example, the VDC 320 can copy a group of encoded tiles to a group of graphic memory sections 652 (e.g., the sections 652-1, 652-2, 652-3, and 652-4). The graphic processing cores 510, as described above, can decode the group of encoded tiles in parallel and store the group of decoded tiles to a group of graphic memory sections 652 (e.g., the sections 652-1, 652-2, 652-3, and 652-4). Then the VDC 320 can copy another group of encoded tiles to a group of graphic memory sections 652 (e.g., the sections 652-5, 652-6, 652-7, and 652-8). The graphic processing cores 510 can decode this group of encoded tiles and store the corresponding group of decoded tiles to a group of graphic memory sections 652 (e.g., the sections 652-5, 652-6, 652-7, and 652-8). In certain embodiments, these operations are continued until the entire encoded image frame 400 are decoded and stored in the graphic memory area 650. Subsequently, the graphic display unit 616 can access the graphic memory area 650 to retrieve the decoded image frame, and then generate display signals as described above.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:
1. A computing device comprising:
   a processor;
   a graphic processing unit having N graphic processing cores, N being an integer greater than 1;

a random access memory (RAM), having a general memory area that is utilized by the processor, and a graphic memory area that is utilized by the graphic processing unit;

a video port;

a non-volatile memory storing a virtual desktop client (VDC) configured to, when executed at the processor,
communicate with a first virtual machine (VM) of a hypervisor running on a remote computing device and receive an encoded image frame from the first VM, wherein the encoded image frame include a plurality of encoded image tiles,
store the plurality of encoded image tiles of the encoded image frame to the general memory area,
copy a first group of N encoded image tiles of the plurality of encoded image tiles to the graphic memory area,
instruct the N graphic processing cores to concurrently decode the first group of encoded image tiles, and
generate a decoded image frame of the encoded image frame; and a display processing unit, configured to generate display signals representing the decoded image frame and transmit the display signals to the video port.

2. The computing device of claim 1, wherein the VDC is configured to instruct each of the graphic processing cores to decode a respective one of the first group of encoded image tiles.

3. The computing device of claim 1, further comprising a network communication interface,
wherein the RAM further has a display memory area that is utilized by the display processing unit; and
wherein the VDC is configured to
receive the encoded image frame through the network communication interface.

4. The computing device of claim 3, wherein the VDC is configured to
copy the plurality of encoded image tiles to the graphic memory area and instruct the N graphic processing cores to process the encoded image tiles by groups of N image tiles,
copy each group of N decoded image tiles to the general memory area, and
copy the decoded image tiles of the entire decoded image frame to the display memory area; and
wherein the display processing unit is configured to read the decoded image frame from the display memory area.

5. The computing device of claim 1, wherein the graphic memory area includes N graphic memory sections;
wherein the VDC is configured to copy each of the N encoded image tiles of the first group to a respective one of the N graphic memory sections; and
wherein the N graphic processing cores each are configured to, upon receiving instructions from the VDC,
read and decode a respective encoded image tile of the first group stored in a respective one of the N graphic memory sections, and
replace the respective encoded image tile stored in the respective graphic memory section with the respective decoded image tile.

6. The computing device of claim 5, wherein the VDC is configured to copy the decoded image tiles from the N graphic memory sections to the general memory area.

7. The computing device of claim 6, wherein the VDC is configured to
copy each of a second group of N encoded image tiles to a respective one of the N graphic memory sections;
wherein the N graphic processing cores each are configured to, upon receiving instructions from the VDC,
read and decode a respective encoded image tile of the second group stored in a respective one of the N graphic memory sections,
replace the respective encoded image tile stored in the respective graphic memory section with the respective decoded image tile, and
wherein the VDC is configured to copy the decoded image tiles from the N graphic memory sections to the general memory area.

8. The computing device of claim 5, wherein the RAM further has a display memory area that is utilized by the display processing unit, and wherein the N graphic processing cores each are configured to, upon finishing decoding the encoded image tile stored in a corresponding one of the N graphic memory sections, store the decoded image tile to the display memory area.

9. The computing device of claim 8, wherein the display processing unit is configured to, subsequent to that the N graphic processing cores has stored all of the decoded image tiles to the display memory area, read the decoded image frame from the display memory area.

10. The computing device of claim 1,
wherein the graphic memory area is further utilized by the display processing unit.

11. The computing device of claim 1, wherein the graphic memory area includes N graphic memory sections;
wherein the VDC is configured to copy each of the N encoded image tiles of the first group to a respective one of the N graphic memory sections; and
wherein the N graphic processing cores each are configured to, upon receiving instructions from the VDC,
read and decode a respective encoded image tile of the first group stored in a respective one of the N graphic memory sections, and
replace the respective encoded image tile stored in the respective graphic memory section with the respective decoded image tile.

12. The computing device of claim 11, wherein the display processing unit is configured to read the decoded image tiles from the graphic memory area and generate display signals corresponding to the decoded image tiles.

13. The computing device of claim 1, wherein the VDC is configured to instruct each of the graphic processing cores through a graphic driver.

14. The computing device of claim 1, wherein the non-volatile memory stores a user interface (UI) configured to, when executed at the processor,
receive input from a user of the computing device, wherein the UI is configured to communicate with the first VM hosted by a hypervisor of a remote computer system, and wherein the UI is configured to initialize the virtual desktop client (VDC) locally; and
send signals associated with input from a user to the first VM hosted by the hypervisor.

15. The computing device of claim 1, wherein the computing device is a thin client or zero client.

16. The computing device of claim 1, wherein the input received from a user of the computing device includes at least one of: user name; password; and selection of a virtual machine.

17. The computing device of claim 1, wherein the non-volatile memory further stores a boot program, wherein the processor is configured to load the boot program into the RAM, wherein the boot program is configured to, when executed by the processor, initialize the RAM and the graphic processing unit.

18. A method implemented by a computing device, the computing device including a processor, a graphic processing unit having N graphic processing cores, N being an integer greater than 1, a random access memory (RAM) having a general memory area that is utilized by the processor and a graphic memory area that is utilized by the graphic processing unit, a video port, a non-volatile memory, and a display processing unit, the method comprising:

at a virtual desktop client (VDC) executed at the processor,
      communicating with a first virtual machine (VM) of a hypervisor running on a remote computing device and receive an encoded image frame from the first VM, the encoded image frame having a plurality of encoded image tiles,
      storing the plurality of encoded image tiles of the encoded image frame to the general memory area,
      copying a first group of N encoded image tiles of the plurality of encoded image tiles to the graphic memory area,
      instructing the N graphic processing cores to concurrently decode the first group of encoded image tiles, and
      generating a decoded image frame of the encoded image frame; and
   generating, at the display processing unit, display signals representing the decoded image frame and transmit the display signals to the video port.

19. The method of claim 18, wherein the computing device further includes a network communication interface, wherein the RAM further has a display memory area that is utilized by the display processing unit, the method comprising:
   at the VDC,
      receiving the encoded image frame through the network communication interface.

20. The method of claim 19, comprising:
   at the VDC,
      copying the plurality of encoded image tiles to the graphic memory area and instructing the N graphic processing cores to process the encoded image tiles by groups of N image tiles,
      copying each group of N decoded image tiles to the general memory area, and
      copying the decoded image tiles of the entire decoded image frame to the display memory area; and
   reading, at the display processing unit, the decoded image frame from the display memory area.

21. The method of claim 18, wherein the graphic memory area includes N graphic memory sections, the method comprising:
   copying, at the VDC, each of the N encoded image tiles of the first group to a respective one of the N graphic memory sections, and
   upon receiving instructions from the VDC, at each of the N graphic processing cores
      reading and decoding a respective encoded image tile of the first group stored in a respective one of the N graphic memory sections, and
      replacing the respective encoded image tile stored in the respective graphic memory section with the respective decoded image tile; and
   copying, at the VDC, the decoded image tiles from the N graphic memory sections to the general memory area.

22. The method of claim 21, the method comprising:
   copying, at the VDC, each of a second group of N encoded image tiles to a respective one of the N graphic memory sections;
   upon receiving instructions from the VDC, at each of the N graphic processing cores,
      reading and decode a respective encoded image tile of the second group stored in a respective one of the N graphic memory sections, and
      replacing the respective encoded image tile stored in the respective graphic memory section with the respective decoded image tile; and
   copying, at the VDC, the decoded image tiles from the N graphic memory sections to the general memory area.

23. The method of claim 21, wherein the RAM further has a display memory area that is utilized by the display processing unit, and the method further comprises:
   upon finishing decoding the encoded image tile stored in a corresponding one of the N graphic memory sections, at each of the N graphic processing cores, storing the decoded image tile to the display memory area; and
   subsequent to that the N graphic processing cores has stored all of the decoded image tiles to the display memory area, at the display processing unit, reading the decoded image frame from the display memory area.

24. The method of claim 18, wherein the computing device further includes a network communication interface, wherein the graphic memory area is further utilized by the display processing unit, the method comprising:
   at the VDC
      receiving the encoded image frame through the network communication interface.

25. The method of claim 18, wherein the graphic memory area includes N graphic memory sections, the method comprising:
   copying, at the VDC, each of the N encoded image tiles of the first group to a respective one of the N graphic memory sections; and
   upon receiving instructions from the VDC, at each of the N graphic processing cores,
      reading and decode a respective encoded image tile of the first group stored in a respective one of the N graphic memory sections, and
      replacing the respective encoded image tile stored in the respective graphic memory section with the respective decoded image tile; and
   reading, at the display processing unit, the decoded image tiles from the graphic memory area and generating display signals corresponding to the decoded image tiles.

26. A non-transitory computer-readable medium storing computer executable instructions for controlling a computing device to perform operations; the computing device including a processor, a graphic processing unit having N graphic processing cores, N being an integer greater than 1, a random access memory (RAM) having a general memory area that is utilized by the processor and a graphic memory area that is utilized by the graphic processing unit, a video port, a non-volatile memory, and a display processing unit; the operations comprising:
   at a virtual desktop client (VDC) executed at the processor,
      communicating with a first virtual machine (VM) of a hypervisor running on a remote computing device and receive an encoded image frame from the first VM, the encoded image frame having a plurality of encoded image tiles,
      storing the plurality of encoded image tiles of the encoded image frame to the general memory area, copying a first group of N encoded image tiles of the plurality of encoded image tiles to the graphic memory area, instructing the N graphic processing cores to concurrently decode the first group of encoded image tiles, and generating a decoded image frame of the encoded image frame; and generating, at the display processing unit, display signals representing the decoded image frame and transmit the display signals to the video port.

27. The non-transitory computer-readable medium of claim 26, wherein the computing device further includes a network communication interface, wherein the RAM further has a display memory area that is utilized by the display processing unit, the operations comprising:

at the VDC,
receiving the encoded image frame through the network communication interface.

28. The non-transitory computer-readable medium of claim 26, wherein the graphic memory area includes N graphic memory sections, the operations comprising:

copying, at the VDC, each of the N encoded image tiles of the first group to a respective one of the N graphic memory sections;

upon receiving instructions from the VDC, at each of the N graphic processing cores
reading and decoding a respective encoded image tile of the first group stored in a respective one of the N graphic memory sections; and replacing the respective encoded image tile stored in the respective graphic memory section with the respective decoded image tile; and copying, at the VDC, the decoded image tiles from the N graphic memory sections to the general memory area.

29. The non-transitory computer-readable medium of claim 26, wherein the computing device further includes a network communication interface, wherein the graphic memory area is further utilized by the display processing unit, the operations comprising:

at the VDC
receiving the encoded image frame through the network communication interface.

30. The non-transitory computer-readable medium of claim 26, wherein the graphic memory area includes N graphic memory sections, the operations comprising:

copying, at the VDC, each of the N encoded image tiles of the first group to a respective one of the N graphic memory sections;

upon receiving instructions from the VDC, at each of the N graphic processing cores,
reading and decode a respective encoded image tile of the first group stored in a respective one of the N graphic memory sections, and replacing the respective encoded image tile stored in the respective graphic memory section with the respective decoded image tile; and reading, at the display processing unit, the decoded image tiles from the graphic memory area and generating display signals corresponding to the decoded image tiles.

* * * * *